(12) United States Patent
Sasao

(10) Patent No.: US 9,151,395 B2
(45) Date of Patent: Oct. 6, 2015

(54) OIL PRESSURE CONTROL DEVICE

(71) Applicant: DENSO CORPORATION, Kariya, Aichi-pref. (JP)

(72) Inventor: Kazuhiro Sasao, Chiryu (JP)

(73) Assignee: DENSO CORPORATION, Kariya (JP)

( * ) Notice: Subject to any disclaimer, the term of this patent is extended or adjusted under 35 U.S.C. 154(b) by 402 days.

(21) Appl. No.: 13/710,747

(22) Filed: Dec. 11, 2012

(65) Prior Publication Data

US 2013/0146799 A1    Jun. 13, 2013

(30) Foreign Application Priority Data

Dec. 12, 2011   (JP) .................................. 2011-271109

(51) Int. Cl.
*F16K 3/24*     (2006.01)
*F16K 11/07*    (2006.01)
*F16K 31/06*    (2006.01)

(52) U.S. Cl.
CPC . *F16K 3/24* (2013.01); *F16K 11/07* (2013.01); *F16K 31/0696* (2013.01)

(58) Field of Classification Search
CPC ........ F16K 3/24; F16K 11/07; F16K 31/0696
USPC ........................... 137/625.69, 625.67, 625.65
See application file for complete search history.

(56) References Cited

U.S. PATENT DOCUMENTS

| 7,104,283 | B2 * | 9/2006 | Ino et al. .................. 137/625.65 |
| 7,926,513 | B2 * | 4/2011 | Ishibashi et al. ......... 137/625.68 |
| 2005/0183783 | A1 | 8/2005 | Holmes et al. |
| 2006/0081298 | A1 | 4/2006 | Segi et al. |
| 2009/0000677 | A1 | 1/2009 | Inaguma et al. |

FOREIGN PATENT DOCUMENTS

| JP | 2008-8380 | 1/2008 |
| JP | 2012-220013 | 11/2012 |

OTHER PUBLICATIONS

Office Action (2 pages) dated Feb. 4, 2014, issued in corresponding Japanese Application No. 2011-271109 and English translation (3 pages).

* cited by examiner

*Primary Examiner* — Craig Schneider
*Assistant Examiner* — Nicole Wentlandt
(74) *Attorney, Agent, or Firm* — Nixon & Vanderhye P.C.

(57) ABSTRACT

An oil pressure control device includes a valve body and a spool valve arranged in the valve body. When the valve body is mounted to a vehicle, the valve body is arranged in air, and has a concave portion which stores oil at a position facing on an upper side. The spool valve has a damper chamber and an orifice causing the damper chamber to communicate with outside. The concave portion is arranged to communicate with a clearance defined between a sleeve of the spool valve and the valve body, and the orifice is opened in a bottom part of the concave portion.

3 Claims, 3 Drawing Sheets

OIL PRESSURE CONTROL DEVICE

CROSS REFERENCE TO RELATED APPLICATION

This application is based on Japanese Patent Application No. 2011-271109 filed on Dec. 12, 2011, the disclosure of which is incorporated herein by reference in its entirety.

TECHNICAL FIELD

The present disclosure relates to an oil pressure control device.

BACKGROUND

JP-2008-008380A describes a spool valve having a damper which restricts a spool from having rapid movement so as to suppress rapid variation in an oil pressure. Specifically, a damper chamber defined between the spool and a sleeve is made to communicate with outside of the sleeve through a small-diameter orifice. The damper chamber may also be referred as a spring chamber, and a space volume of the damper chamber is varied when the spool moves in an axis direction. In a state where the damper chamber is filled with oil, oil passes through only the orifice and the volume of the damper chamber is varied, such that the movement speed of the spool is controlled.

In JP-2008-008380A, a part of a valve body in which the spool valve is disposed is located and used in oil. If the spool valve is used in air, air may be mixed into oil in the damper chamber when oil flows out of the damper chamber, and air may pass through the orifice when the damper chamber has a volume variation. In this case, the damper effect may not be obtained due to the air.

SUMMARY

It is an object of the present disclosure to provide an oil pressure control device which can obtain damper effect when a spool valve is used in air.

According to an example of the present disclosure, an oil pressure control device includes a spool valve and a valve body. The spool valve includes a sleeve having a cylindrical shape and a spool slidably supported in the sleeve. The valve body has a hole in which the sleeve is disposed. A part of the valve body which accommodates the spool valve is arranged in air and the valve body has a concave portion which stores oil at a position facing on an upper side when the valve body is mounted to a vehicle. The spool valve has a damper chamber and an orifice causing the damper chamber to communicate with outside of the sleeve, and a volume of the damper chamber is varied when the spool moves in an axis direction. The concave portion is arranged to communicate with a clearance defined between the sleeve and the hole, and the orifice is opened in a bottom part of the concave portion.

Accordingly, the oil pressure control device can obtain damper effect when the spool valve is used in air.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1A:
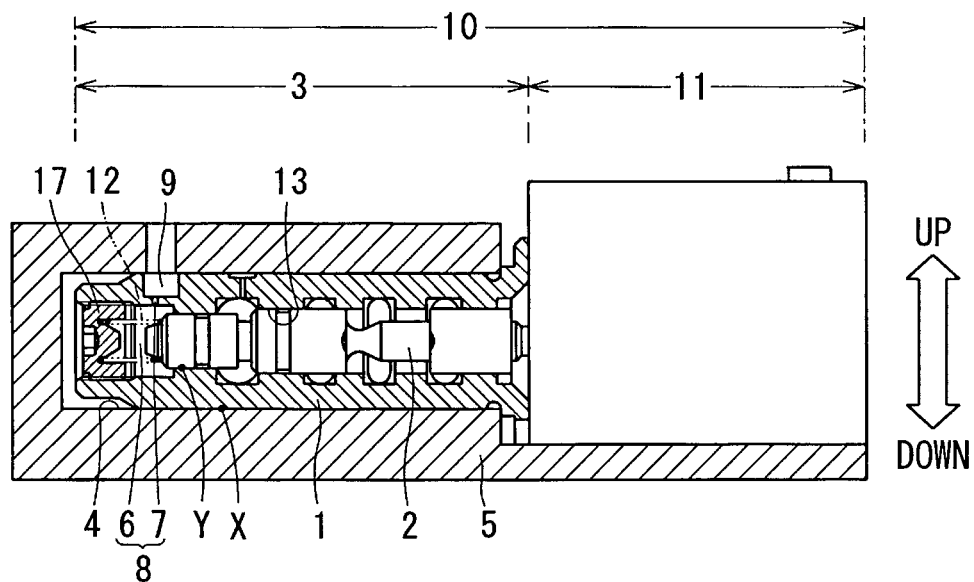
FIG. 1A is a cross-sectional view illustrating an oil pressure control device according to an embodiment.

An oil pressure control device includes a spool valve 3 and a valve body 5. The spool valve 3 has a sleeve 1 and a spool 2, and controls an oil pressure. The valve body 5 has an accommodation hole 4 accommodating the sleeve 1. When the oil pressure control device is mounted to a vehicle, a part of the valve body 5 accommodating the spool valve 3 is located in air.

The spool valve 3 is equipped with a damper 8 having a damper chamber 6 and an orifice 7. A volume of the damper chamber 6 is varied when the spool 2 moves in an axis direction. The orifice 7 has a relatively small diameter, and causes the damper chamber 6 to communicate with outside of the sleeve 1. The valve body 5 has a concave portion 9 which stores oil, and the concave portion 9 is exposed outside on the upper side of the spool valve 3 when the oil pressure control device is mounted to a vehicle.

The concave portion 9 is defined by combining a sleeve notch part α defined in the sleeve 1 and a body notch part β defined in the valve body 5. That is, the sleeve notch part α corresponds to a cutout defined in the sleeve 1, and the body notch part β corresponds to a cutout defined in the valve body 5. At least a part of a bottom of the concave portion 9 is defined by the sleeve 1. Thereby, the concave portion 9 communicates with a clearance X defined between the sleeve 1 and the accommodation hole 4 of the valve body 5, and oil leaked through the clearance X is supplied to the concave portion 9. As a result, oil is accumulated inside of the concave portion 9. Alternatively, oil leaked through a clearance Y defined between the sleeve 1 and the spool 2 fills the damper chamber 6, and a part of the oil overflows from the damper chamber 6 through the orifice 7 into the concave portion 9, such that oil is accumulated in the concave portion 9.

Because the orifice 7 is opened in the bottom of the concave portion 9, approximately the same damper effect can be obtained when the oil pressure control device is used in air as a case where the oil pressure control device is used in oil. That is, even if the valve body 5, in which the spool valve 3 is disposed, is arranged in air, the damper chamber 6 is always filled with oil. Further, because only oil can pass through the orifice 7, the damper effect can be obtained with reliability.

Details of the oil pressure control device will be described. The following embodiment is just an example, and the present disclosure is not limited to the embodiment. Up-and-down direction described in the embodiment with reference to drawings is defined when the oil pressure control device is mounted to a vehicle.

The oil pressure control device is mounted to, for example, an automatic shift for the vehicle, and is used for switching the shift condition of the automatic shift. The oil pressure control device includes an electromagnetic spool valve 10 which controls an output oil pressure, and the valve body 5. The electromagnetic spool valve 10 is attached to the valve body 5. A part of the valve body 5, in which the spool valve 3 is disposed, is arranged in air.

The electromagnetic spool valve 10 is defined by combining a linear solenoid 11 to the spool valve 3 in the axis direction. The linear solenoid 11 drives the spool valve 3. The spool valve 3 has a well-known structure with a return spring 12 in addition to the sleeve 1 and the spool 2.

The spool valve 3 may be a normally close type valve in which an output port is closed when the linear solenoid 11 is not energized. Alternatively, the spool valve 3 may be a normally open type valve in which the maximum oil pressure is generated in an output port when the linear solenoid 11 is not energized.

Figure 2A:
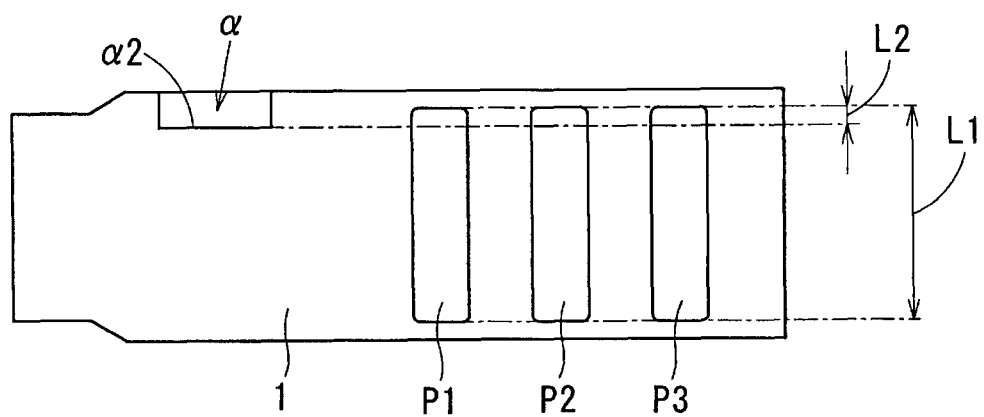
FIG. 2A is a schematic side view illustrating a sleeve of the spool valve.

The sleeve 1 has an approximately cylindrical shape, and is used in the state where the sleeve 1 is inserted into the accommodation hole 4 of the valve body 5. A through hole 13 is defined at the center of the sleeve 1, and supports the spool 2 to be slidable in the axis direction. As shown in FIG. 2A, an outer circumference surface of the sleeve 1 has an input port P1, an output port P2, and a discharge port P3. Because the spool valve 3 is, for example, the normally close type valve in the embodiment, the input port P1, the output port P2, and the discharge port P3 are arranged from left to right in FIG. 2A.

Figure 3:
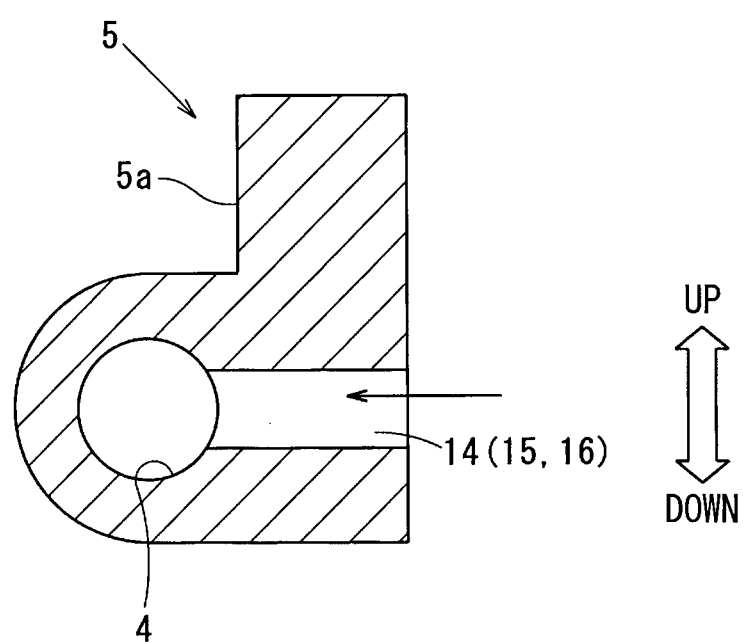
FIG. 3 is a schematic cross-sectional view illustrating a valve body into which the spool valve is inserted.

The input port P1 communicates with an oil-pressure supply passage 14 defined in the valve body 5, as shown in FIG. 3, in the state where the sleeve 1 is attached to the accommodation hole 4. The supply passage 14 is an oil passage to which a pump oil pressure is supplied from a pump (not shown).

The output port P2 communicates with an output generating passage 15 defined in the valve body 5 in the state where the sleeve 1 is attached to the accommodation hole 4. The output generating passage 15 is an oil passage communicating with, for example, a friction engagement device (not shown) of the automatic shift.

The discharge port P3 communicates with a drain passage 16 defined in the valve body 5 in the state where the sleeve 1 is attached to the accommodation hole 4. The drain passage 16 is an oil passage communicating with a space leading to an oil pan (not shown).

The spool 2 is inserted into the sleeve 1, and is slidably contact with the inner circumference surface of the through hole 13. Each open area of the ports P1, P2, P3 is varied and controlled by the axial position of the spool 2. Thus, the communication state of the port P1, P2, P3 is changed. The open area represents an area through which oil can pass.

Figure 1B:
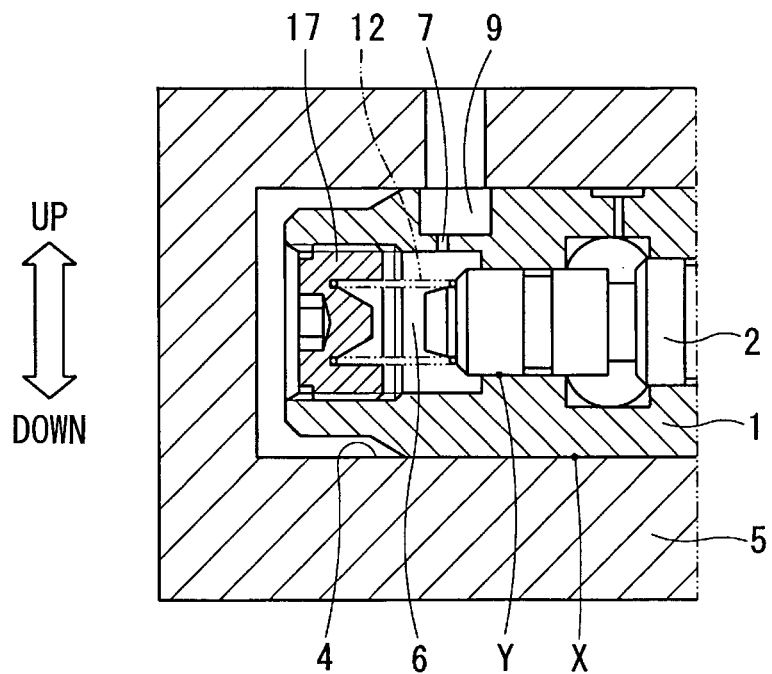
FIG. 1B is a cross-sectional view illustrating a damper of a spool valve of the oil pressure control device.

The return spring 12 may be made of a compression coil spring, and biases the spool 2 toward the linear solenoid 11 (rightward in FIG. 1). The return spring 12 is arranged in the damper chamber 6 (spring chamber) in the compressed state, so the return spring 12 is located on the left side of the sleeve 1 in FIG. 1. Specifically, a first end of the return spring 12 is in contact with the spool 2, and a second end of the return spring 12 is in contact with an adjusting screw 17 which closes a front end of the through hole 13 of the sleeve 1. A biasing force of the return spring 12 is adjusted by changing a screwing amount of the adjusting screw 17.

The linear solenoid 11 is combined to the right end of the sleeve 1 in FIG. 1, and is a well-known driving portion which displaces the spool 2 leftward in FIG. 1 against the biasing force of the return spring 12 according to the magneto-motive force corresponding to the energizing amount. The linear solenoid 11 is controlled (duty ratio control etc.) by an electronic control unit (not shown, AT-ECU etc.). The axial position of the spool 2 is controlled by the electronic control unit through the linear solenoid 11, so the output oil pressure is controlled.

As shown in FIG. 3, the valve body 5 may be mounted to, for example, a side face of a vehicle component. Plural oil passages are defined inside the valve body 5, and communicate with the hole 4 such as the port P1, P2, P3. The oil passages extend in the horizontal direction and may correspond to the supply passage 14, the output generating passage 15 and the drain passage 16.

The spool valve 3 has the damper 8 which brakes rapid movement of the spool 2 so as to suppress rapid variation in the output oil pressure (control oil pressure). The damper 8 has the damper chamber 6 and the orifice 7. The damper chamber 6 is defined in the sleeve 1, and the volume of the damper chamber 6 is varied when the spool 2 moves in the axis direction. The orifice 7 is defined in the sleeve 1, and has a relatively small diameter to decrease the flow speed of oil. The orifice 7 causes the damper chamber 6 to communicate with outside.

The valve body 5 of the oil pressure control device, which accommodates the spool valve 3, is arranged in air. In the present embodiment, the concave portion 9 is defined in the valve body 5 on the upper side of the damper chamber 6, and stores oil inside. Further, the orifice 7 is opened in the bottom of the concave portion 9, and communicates with the concave portion 9.

The damper chamber 6 of this embodiment also works as the spring chamber in which the return spring 12 is arranged. The return spring 12 is located between the adjusting screw 17 and the spool 2. Further, the damper chamber 6 is filled with oil which is supplied through the clearance Y (sliding clearance) between the sleeve 1 and the spool 2.

When the spool valve 3 is attached to the valve body 5, the orifice 7 is arranged to face upward in the radial direction of the sleeve 1 in a manner that the damper chamber 6 and the bottom of the concave portion 9 communicate with each other through the orifice 7.

The concave portion 9 is constructed by combining the sleeve notch part α formed in the sleeve 1 and the body notch part β formed in the valve body 5.

Figure 2B:
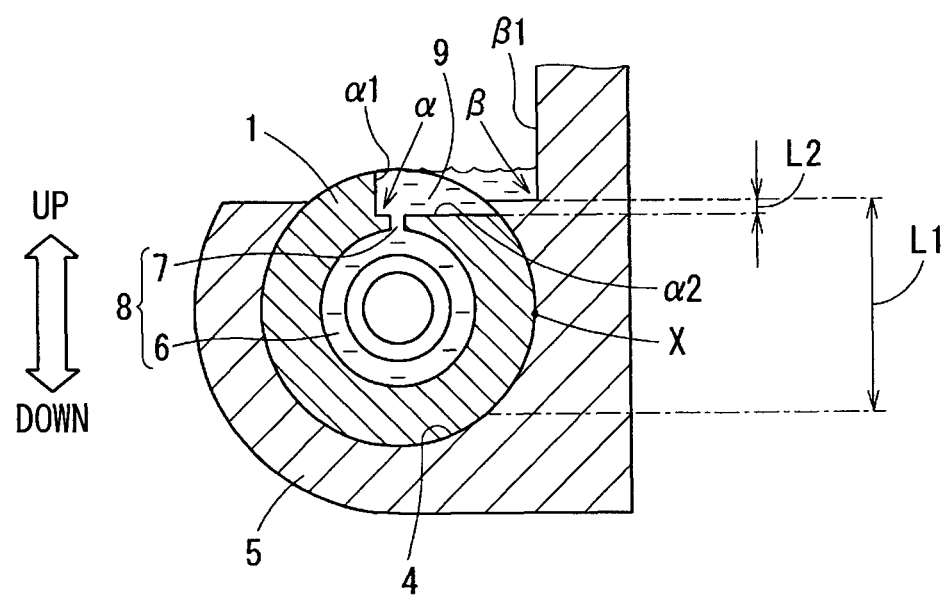
FIG. 2B is a cross-sectional view illustrating the oil pressure control device seen in an axis direction.

Specifically, as shown in FIG. 2B, the sleeve notch part α has L-shape cross-section when seen in the axis direction, and has U-shape when seen from the upper side. The body notch part β has L-shape cross-section when seen in the axis direction, and has U-shape when seen from the upper side. The concave portion 9 has approximately rectangular recess shape by combining the sleeve notch part α and the body notch part β. The shapes of the sleeve notch part α, the body notch part β and the concave portion 9 are not limited to the above descriptions, and may be modified suitably.

As described above, because the valve body 5 may be mounted to the side face of the vehicle component, as shown in FIG. 3, the valve body 5 has a vertical side face 5a extending in the up-and-down direction, on the upper side near the hole 4. As shown in FIG. 2B, when the concave portion 9 is seen in the axis direction, a vertical wall β1 of the body notch part β is defined on extension of the vertical side face 5a of the valve body 5. The vertical wall β1 corresponds to a side face of the concave portion 9. Thus, as shown in FIG. 2B, the width dimension of the concave portion 9 can be made large when seen in the axis direction.

When the concave portion 9 is seen from the axis direction, as shown in FIG. 2B, a vertical wall α1 of the sleeve notch part α, which also defines a side face of the concave portion 9, is defined near a perpendicular line which passes through the center axis of the sleeve 1 when the spool valve 3 is seen from the axis direction. Thus, the vertical (up-and-down) dimension of the vertical wall a1 of the sleeve notch part α can be made as long as possible. The vertical dimension may correspond to the minimum height of the lateral wall of the concave portion 9.

The orifice 7 has an opening in a horizontal bottom surface α2 of the sleeve notch part α, and the orifice 7 communicates with the bottom of the concave portion 9. Specifically, the bottom wall α2 of the sleeve notch part α defines the bottom part of the concave portion 9, and the bottom wall α2 of the sleeve notch part α communicates with the orifice 7.

According to the embodiment, the oil pressure control device has the concave portion 9 defined by combining the sleeve notch part α and the body notch part β, and the concave portion 9 communicates with the clearance X between the sleeve 1 and the valve body 5. For this reason, leak oil which enters the clearance X is led to the concave portion 9, thus, the leak oil is supplied to the concave portion 9. As a result, oil is accumulated inside of the concave portion 9.

Moreover, the damper chamber 6 is filled with leak oil flowing from the clearance Y between the sleeve 1 and the spool 2, and a part of the leak oil flows outside through the orifice 7 into the concave portion 9. Thus, oil is accumulated in the concave portion 9.

The orifice 7 is arranged to on the upper side of the damper chamber 7 and communicate with the bottom of the concave portion 9. Therefore, when the valve body 5 accommodating the spool valve 3 is arranged in air, the damper chamber 6 can be always filled with oil. Further, because only oil can pass through the orifice 7, the damper 8 can provide the damper effect with reliability.

Even if the valve body 5 accommodating the spool valve 3 is arranged in air, the movement of the spool 2 can be certainly controlled by the damper 8 of the spool valve 3. Therefore, a rapid change in the output oil pressure can be prevented. That is, approximately the same damper effect can be obtained when the oil pressure control device is used in air as the case where the oil pressure control device is used in oil.

According to the embodiment, the vertical wall β1 of the body notch part β is located on the extension of the vertical side face 5a of the valve body 5, so the width size of the concave portion 9 can be made large when seen in the axis direction. Further, the vertical wall α1 of the sleeve notch part α is located near the perpendicular line which passes through the center axis of the sleeve 1, so the vertical dimension of the concave portion 9 can be made long. Thus, the concave portion 9 can be secured to store much oil. Further, when the spool valve 3 is used is air, the reliability of the damper 8 can be improved.

According to the embodiment, as shown in FIG. 2A, the bottom of the concave portion 9 (the horizontal bottom surface α2 of the sleeve notch part α) in which the orifice 7 is opened is provided below the upper end of the input port P1. In FIGS. 2A and 2B, the input port P1 is defined to have an open dimension L1 in the up-and-down direction. Further, an overlap dimension L2 in the up-and-down direction is defined by an overlap between the opening of the concave portion 9 and the opening of the input port P1 in the up-and-down direction. The concave portion 9 has a depth from the bottom in which the orifice 7 is opened, and the depth is larger than the overlap dimension L2 and is smaller than or equal to the height of the vertical wall al of the sleeve notch part α.

While the engine is operated, the pump oil pressure pressurized by the pump is always impressed to the input port P1 through the supply passage 14. A part of the pressurized oil supplied to the input port P1 enters the clearance X, and is supplied to the concave portion 9 as leak oil. For this reason, inside of the concave portion 9, oil level is secured to be at least the same as the upper end of the input port P1 or more. Thus, oil can be certainly accumulated in the concave portion 9 with a predetermined quantity or more. Even if the spool valve 3 is used in air, the reliability of the damper 8 can be improved.

The vertical wall (lateral wall) of the concave portion 9 is defined by combining the sleeve notch part α and the body notch part β in the above embodiment. Alternatively, the vertical wall (lateral wall) of the concave portion 9 may be defined by cutting only the valve body 5.

The linear solenoid 11 (electromagnetism actuator) drives the spool valve 3 in the above embodiment. The driving portion of the spool valve 3 is not limited to the linear solenoid 11. The spool valve 3 may be driven with oil pressure (pilot hydraulic pressure etc.), or other driving portion such piezoelectric actuator.

The present disclosure is applied to the spool valve 3 which is used in the oil pressure control device of the automatic shift for the vehicle. Alternatively, the present disclosure may be applied to other spool valve such as oil pressure control valve (OCV) used in a variable valve timing (VVT) mechanism.

Such changes and modifications are to be understood as being within the scope of the present disclosure as defined by the appended claims.

What is claimed is:

1. An oil pressure control device comprising:
    a spool valve including a sleeve having a cylindrical shape and a spool slidably supported in the sleeve; and
    a valve body having an accommodation hole in which the sleeve is disposed, wherein
    the valve body which accommodates the spool valve is arranged in air and the valve body has a concave portion which stores oil at a position facing on an upper side when the valve body is mounted to a vehicle,
    the spool valve has a damper chamber and an orifice causing the damper chamber to communicate with outside of the sleeve, and a volume of the damper chamber is varied when the spool moves in an axis direction,
    the concave portion is arranged to communicate with a clearance defined between the sleeve and the valve body, and
    the orifice is opened in a bottom part of the concave portion, wherein
    the concave portion is defined by combining a sleeve notch part corresponding to a cutout defined in the sleeve and a body notch part corresponding to a cutout defined in the valve body.

2. The oil pressure control device according to claim 1, wherein
    the sleeve notch part has a vertical wall defining a side face of the concave portion, and
    the vertical wall of the sleeve notch part is located adjacent to a vertical line passing through a center axis of the sleeve when the spool valve is seen in the axis direction.

3. The oil pressure control device according to claim 1, wherein
    the valve body has a supply passage which supplies an oil pressure to the spool valve,
    the sleeve has an input port through which the oil pressure is introduced from the supply passage into the sleeve,
    the sleeve notch part has a bottom wall defining the bottom part of the concave portion, and
    the bottom wall of the sleeve notch part communicates with the orifice, and is located below an upper end of the input port.

* * * * *